(12) United States Patent
Heinemann et al.

(10) Patent No.: US 7,941,393 B2
(45) Date of Patent: May 10, 2011

(54) METHOD FOR PREDICTIVE DETERMINATION OF A PROCESS VARIABLE BASED ON AN ASSIGNMENT OF A DISCRETE MEASURED VALUE

(75) Inventors: Lothar Heinemann, Hirschberg (DE); Jürgen Glock, Hirschberg (DE)

(73) Assignee: ABB Technology AG, Zurich (CH)

( * ) Notice: Subject to any disclaimer, the term of this patent is extended or adjusted under 35 U.S.C. 154(b) by 80 days.

(21) Appl. No.: 12/430,307

(22) Filed: Apr. 27, 2009

(65) Prior Publication Data

US 2009/0248606 A1 Oct. 1, 2009

Related U.S. Application Data

(63) Continuation of application No. PCT/EP2007/009320, filed on Oct. 26, 2007.

(30) Foreign Application Priority Data

Oct. 28, 2006 (DE) .......................... 10 2006 050 938

(51) Int. Cl.
*G06F 15/00* (2006.01)
*G06F 15/18* (2006.01)
(52) U.S. Cl. ........................................................ 706/62
(58) Field of Classification Search ...................... 706/62
See application file for complete search history.

(56) References Cited

U.S. PATENT DOCUMENTS

| | | |
|---|---|---|
| 4,215,412 A | 7/1980 | Bernier et al. |
| 5,561,610 A | 10/1996 | Schricker et al. |
| 5,566,092 A | 10/1996 | Wang et al. |
| 5,950,147 A | 9/1999 | Sarangapani et al. |

(Continued)

FOREIGN PATENT DOCUMENTS

| | | |
|---|---|---|
| DE | 4447288 A1 | 7/1995 |
| EP | 1542108 A1 | 6/2005 |

(Continued)

OTHER PUBLICATIONS

Collins Dictionary of Biology 2005, 'linear regression', Credo Reference, [retrieved on Aug. 30, 2010]. Retrieved from the Internet <URL:http://www.credoreference.com/entry/collinsbiology/linear_regression_analysis>.*

(Continued)

*Primary Examiner* — Michael B. Holmes
*Assistant Examiner* — Peter Coughlan
(74) *Attorney, Agent, or Firm* — Buchanan Ingersoll & Rooney PC

(57) ABSTRACT

A system and method are disclosed for predictive determination of a process variable (P) in a technical installation. Measured values for the process variable (P) are recorded at predeterminable points in time. Temporally successive recorded measured values are combined to form a weighted measured value. A discrete measured value is assigned to each weighted measured value. Each weighted measured value that lies in a predeterminable tolerance band is assigned a same discrete measured value. A future temporal progression of the process variable (P) is estimated using a linear regression of the discrete measured values, and a point in time in which the process variable (P) reaches a predeterminable limit value is calculated.

14 Claims, 3 Drawing Sheets

U.S. PATENT DOCUMENTS

| | | |
|---|---|---|
| 7,052,472 B1 | 5/2006 | Miller et al. |
| 2002/0077792 A1 | 6/2002 | Qiu |
| 2003/0065409 A1 | 4/2003 | Raeth et al. |
| 2006/0128820 A1* | 6/2006 | Ehbing et al. .................. 521/50 |
| 2007/0150220 A1 | 6/2007 | Bode |

FOREIGN PATENT DOCUMENTS

| | | |
|---|---|---|
| GB | 2290872 A | 1/1996 |
| WO | WO 98/55904 | 12/1998 |

OTHER PUBLICATIONS

Collins Dictionary of Economics 2005, 'correlation coefficient', Credo Reference, [retrieved on Aug. 30, 2010]. Retrieved from the Internet <URL:http://www.credoreference.com/entry.do?id=5964463>.*

International Search Report (PCT/ISA/210) for PCT/EP2007/009320, completed Jan. 30, 2008.

* cited by examiner

METHOD FOR PREDICTIVE DETERMINATION OF A PROCESS VARIABLE BASED ON AN ASSIGNMENT OF A DISCRETE MEASURED VALUE

RELATED APPLICATIONS

This application claims priority as a continuation application under 35 U.S.C. §120 to PCT/EP2007/009320, which was filed as an International Application on Oct. 26, 2007 designating the U.S., and which claims priority to German Application 10 2006 050 938.2 filed in Germany on Oct. 28, 2006. The entire contents of these applications are hereby incorporated by reference in their entireties.

TECHNICAL FIELD

The disclosure relates to a method for predictive determination of a process variable. For example, the method can be used to monitor the pressure of an insulating gas in a gas-insulated switching installation.

BACKGROUND INFORMATION

A measurement of process variables is fundamentally subject to errors. For example, there can be superposed on the measurement signal interfering variables that occur systematically or stochastically, which can influence the actual measurement signal and often which cannot be acquired mathematically. Whereas systematic interfering variables and the measurement errors resulting therefrom can be compensated by suitable measures in the signal flow diagram, stochastic interfering variables and their effects are less capable of being controlled.

Predictive determination of process variables can also be difficult when it is desired to consider a comparatively long time period of, for example, 30 years, and there is a desire for this purpose to evaluate comparatively many measured values approximately continuously or at comparatively short intervals, for example one measured value per minute. Predictive determination involves transfer of the measured data in a functional relationship. Various mathematical methods that are described in the literature exist for this purpose. The method should then be capable of detecting and evaluating long term changes just like short term changes.

By way of example, gastight monitoring in SF6 gas-insulated high-voltage switching installations is such a case. Such gas-insulating switching installations have a technically induced leakage rate that becomes noticeable from a pressure loss, and can be less than 0.5% per year in relation to the desired gas fill pressure when the switching installation is commissioned. In the case of a technical defect, for example a porous seal, however, the leakage rate can be higher.

The recorded measured values for the gas pressure are subject to measurement errors. In particular, the temperature of the insulating gas is a source of such measurement errors. This temperature is dependent on the ambient temperature, which fluctuates in the course of a day and of a year, as well as on the current flow and the heat loss produced thereby in the monitored gas space. It can be likewise difficult to acquire the gas temperature for the purpose of computational correction or compensation of the measurement errors, particularly as induced by the inhomogeneous temperature distribution inside a gas space.

Predictive determination of a continuously measured process variable, specifically the pressure of the insulating gas, should therefore be able to detect and analyze both comparatively slow and comparatively quick variations in the gas pressure. A purely mathematical approximation of all recorded measured values for the gas pressure by means of a mathematical approximation function can be excessively expensive; in particular there would be a relatively high computing power involved.

SUMMARY

A method for predictive determination of a process variable (P) in a technical installation is disclosed, comprising: recording measured values for the process variable (P) of the technical installation at predeterminable points in time during operation of the technical installation; combining temporally successive recorded measured values to form a weighted measured value; assigning a discrete measured value to each weighted measured value; estimating a future time profile of the process variable (P) using a regression of the discrete measured values; and calculating a point in time at which the process variable (P) reaches a predeterminable limit value.

A system for predictive determination of a process variable (P) in a technical installation, comprising: a sensor; a database for recording measured values for the process variable (P) of the technical installation at predeterminable points in time during operation of the technical installation; and a processor for executing a program for: combining temporally successive recorded measured values to form a weighted measured value; assigning a discrete measured value to each weighted measured value; estimating a future time profile of the process variable (P) using a regression of the discrete measured values; and calculating a point in time at which the process variable (P) reaches a predeterminable limit value.

BRIEF DESCRIPTION OF THE DRAWINGS

The disclosure, advantageous refinements and improvements of the disclosure, and further advantages will be explained in more detail and described with the aid of the drawings, in which exemplary embodiments of the disclosure are illustrated, and in which.

DETAILED DESCRIPTION

A method is disclosed that in conjunction with a relatively low outlay can permit sufficiently accurate predictive determination of a process variable in a technical installation to be carried out.

According to an exemplary embodiment of the disclosure, measured values for the process variable are firstly recorded at predeterminable points in time. Subsequently, temporally successive recorded measured values are combined to form a weighted measured value, and a discrete measured value is assigned to each weighted measured value. The future time profile of the process variable is estimated by means of a regression of the discrete measured values, and a point in time at which the process variable reaches a predeterminable limit value is calculated.

Thus the number of the measured values to be processed can be reduced, and interfering variables superposed on the process variable can be compensated. Such an estimate can be carried out with a relatively low computing power and permits a relatively accurate prediction of the profile of the process variable.

An exemplary form of the regression is the linear regression. A linear regression, that is to say an approximation of the measured values by a straight line, is relatively easy to carry out and yields sufficiently accurate results.

The method can be applied, for example, in gas-insulated switching installations, where the process variable is the pressure of an insulating gas in a gas space of the switching installation. When the pressure of the insulating gas has dropped to a predetermined blocking pressure, the switching installation is thus no longer functional, that is to say further switching operations cannot be carried out.

In this case, the method permits the calculation of the point in time at which the pressure of the insulating gas reaches the predetermined blocking pressure. Before this point in time, the operator of the switching installation can then arrange in good time for the switching installation, or only for individual parts of the switching installation, to be maintained or repaired.

Figure 1:
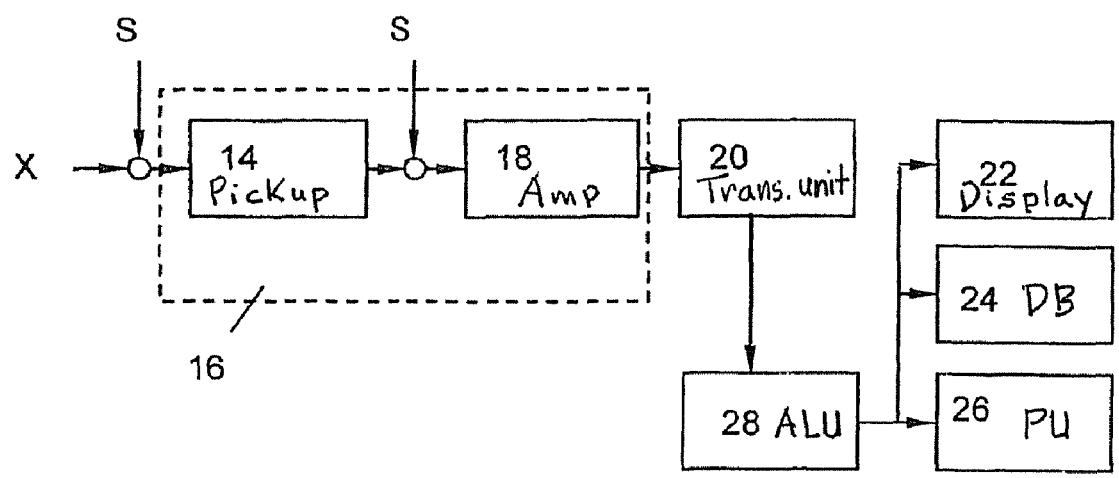
FIG. 1 shows an exemplary signal flow diagram for recording and processing measured values.

FIG. 1 illustrates an exemplary signal flow diagram for recording and processing measured values. A pickup 14 acquires a process variable X on which an interfering variable S is superposed. The pickup 14 supplies an electric signal that is further processed (e.g., amplified) by an intermediate circuit 18. The electric signal supplied by the pickup 14 likewise has an interfering variable S superposed on it. The pickup 14 and the intermediate circuit 18 together form a sensor 16.

The intermediate circuit 18 supplies an amplified output signal to a transmission unit 20 that transmits the amplified output signal, for example by radio or via a line, to an arithmetic logic unit 28. The arithmetic logic unit 28 further processes the amplified output signal received from the transmission unit 20, for example carries out digitization, and supplies the further processed output signal in the form of individual measured values to a display unit 22 and to a recording unit 24 and a data processing unit 26.

In this example, the display unit 22 is a monitor on which the profile of the measured process variable X is illustrated graphically. The display unit 22 can also be a printer or a plotter. The recording unit 24 can be a database in which the measured values received from the arithmetic logic unit 28 are stored.

The data processing unit 26, for example, is a digital computer that executes a computer program to further process the measured values received from the arithmetic logic unit 28 in accordance with the disclosed method.

Figure 2:
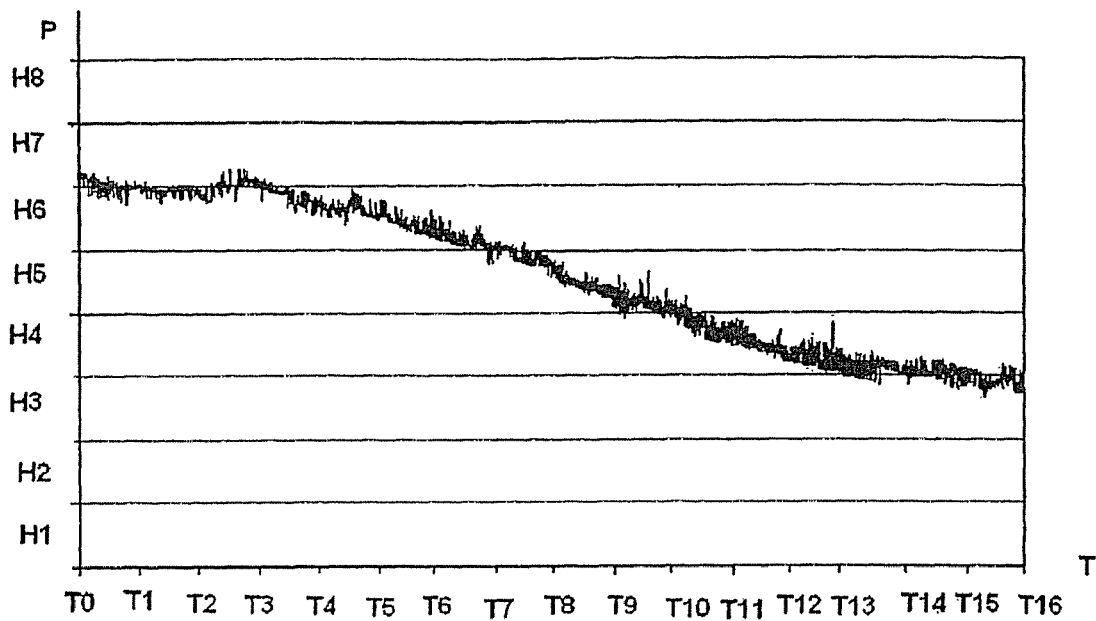
FIG. 2 shows an exemplary profile of recorded measured values for the pressure of an insulating gas.

FIG. 2 shows a diagram of a profile of recorded measured values for a process variable X using the example of a pressure P of an insulating gas in a gas space of a gas-insulated switching installation during a time T. However, it is also possible to display the profile of other process variables X such as, for example, a filling level, a temperature or a field strength.

At a large number of predetermined points in time, one measured value was recorded for the pressure P of the insulating gas and entered in the diagram. The profile of these measured values is to be regarded as approximately continuous in time and continuous in value.

Also illustrated in the diagram are weighted points in time T0 to T16, and tolerance bands H1 to H8.

The measured values that were recorded in the evaluation interval between the weighted points in time T0 and T1 are combined (e.g., temporally successive recorded measured values are combined to form a weighted measured value and assigned to the weighted point in time T1. The weighted measured value is, for example, calculated as the arithmetic mean of said measured values.

Likewise, weighted measured values for the remaining weighted points in time T2 to T16 are produced and assigned to the respective weighted points in time. The profile of the weighted measured values is time discrete and continuous in terms of value.

In this example, the weighted points in time T0 to T16 constitute the bounds of the evaluation intervals. It is also possible for the weighted points in time to be respectively arranged in the middle of, or at another point in, an evaluation interval.

Subsequently, a discrete measured value is assigned to each of the weighted measured values thus obtained. In this case, the same discrete measured value is assigned to all weighted measured values that lie in the same tolerance band H1 to H8.

In this example, the assigned discrete measured values lie respectively in the middle of a tolerance band. It is also possible to select other discrete measured values that lie, for example, at the edge of the respective tolerance band.

Figure 3:
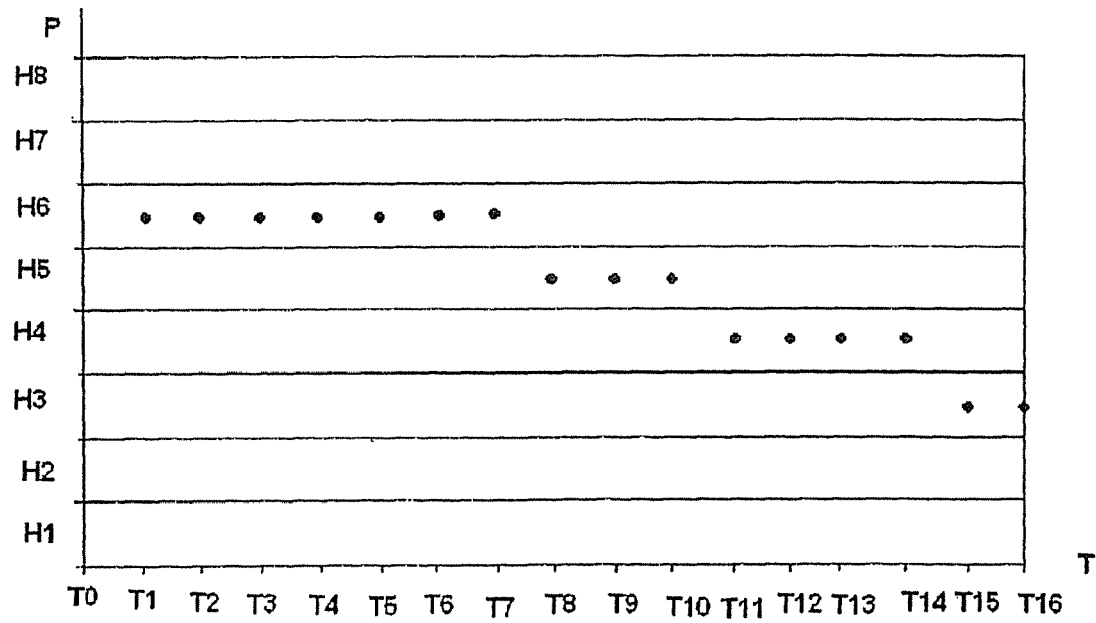
FIG. 3 shows exemplary discrete measured values produced from the profile according to FIG. 2.

The discrete measured values thus produced are illustrated in FIG. 3. The profile of the discrete measured values is time discrete and discrete in terms of value.

In the example selected, the time intervals between the weighted points in time are equal and respectively amount to one hour. Other time intervals, for example one minute, a day or a year, are also possible. Likewise, time durations of different size between the weighted points in time are possible.

The shorter the time intervals between the weighted points in time, the more accurate the profile of the discrete measured values becomes. The larger the time intervals between the weighted points in time, the less the computing power required.

In the example selected, all the tolerance bands H1 to H8 have the same width of, for example, 100 mbar. However, other different widths of the tolerance bands are also conceivable.

In the example selected, each tolerance band borders directly on the respectively neighboring tolerance bands. It is also possible for tolerance bands to overlap one another. In this case, a weighted measured value that lies in the overlap region of two tolerance bands is assigned, for example, to the discrete measured value that was assigned to the weighted measured value preceding it in time. That is to say, the assignment of the weighted measured values to the discrete measured values follows a hysteresis.

Figure 4:
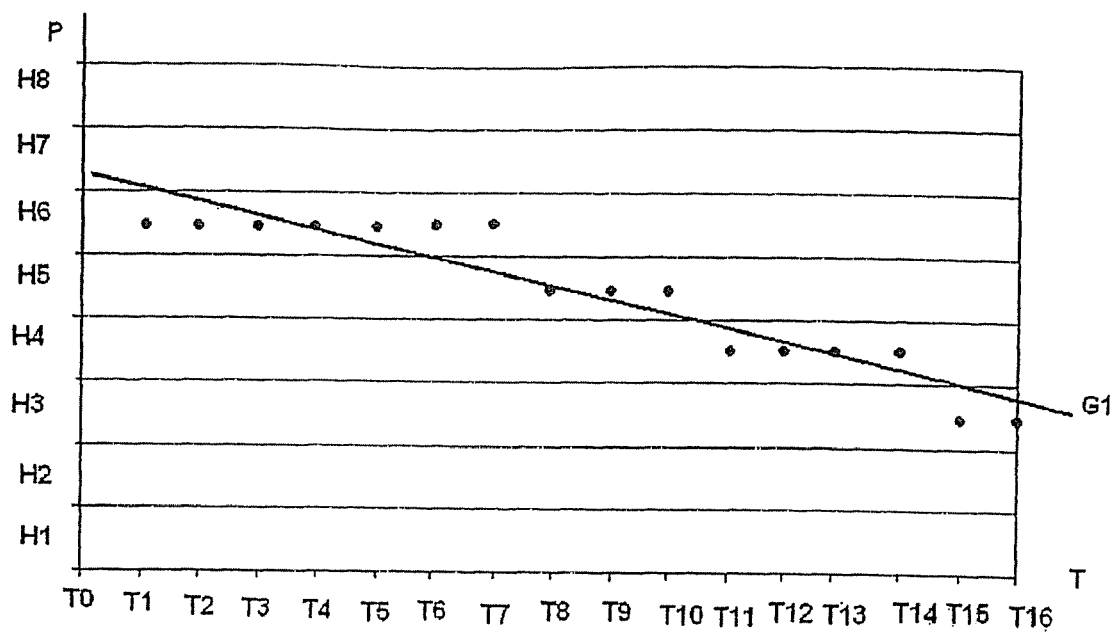
FIG. 4 shows an exemplary linear regression of the discrete measured values from FIG. 3.

A linear regression of the discrete measured values from FIG. 3 is illustrated in FIG. 4. Instead of a linear regression, other regressions are also possible and applicable, for example quadratic, exponential or logarithmic regressions.

The discrete measured values are used to calculate an equation for a first regression line G1, for example using the method of least error squares. The mathematical mode of procedure for determining the parameters for this equation is not explained here in more detail, being known in general to the person skilled in the art.

The first regression line G1 is determined such that it approximates a profile of the discrete measured values as accurately as possible. The gradient of the first regression line G1 corresponds here to the pressure loss in the monitored gas space. A future time profile of the pressure P can therefore be estimated (i.e., determined predicatively) from the profile of the first regression line G1.

For example, it is possible to estimate at which prospective point in time TX the pressure P will reach a predetermined lower limit value. This lower limit value is denoted below as blocking pressure, and corresponds to the pressure in the gas space of the gas-insulated switching installation at which it is no longer possible to operate the switching installation.

A numerical example may be used to illustrate the calculation of the prospective point in time TX up to when the blocking pressure is reached. Let the gas space of the switching installation be filled with a pressure of 7 bar at the beginning of the recording of the measured values. A determination of the regression lines would yield a pressure loss of 35 mbar per year. The blocking pressure will be 6.2 bar. Consequently, the prospective point in time TX up to when the blocking pressure is reached is calculated as 22.86 years after the beginning of the recording of the measured values.

Figure 5:
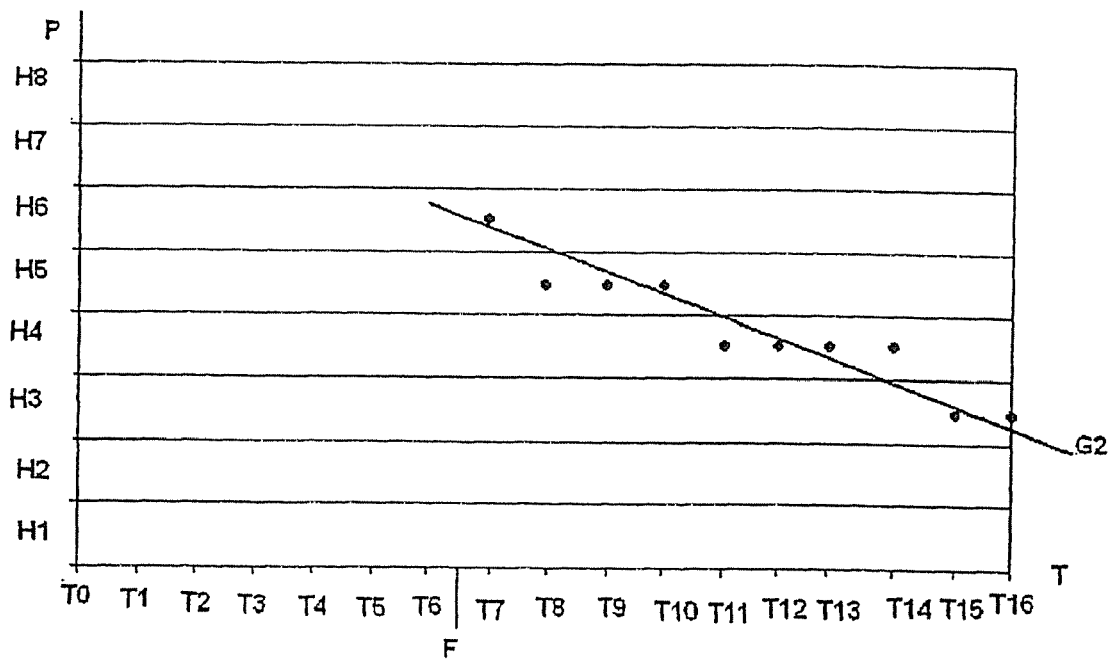
FIG. 5 shows an exemplary linear regression of selected discrete measured values from FIG. 3.

A linear regression of selected discrete measured values from FIG. 3 is illustrated in FIG. 5. To determine the equation for a second regression line G2, account is taken merely of the discrete measured values that lie in time after a predeterminable point in time which is denoted below as window bound F. Measured values lying ahead of the window bound F in time are, for example, ignored.

In this example, the window bound F is fixed between the weighted points in time T6 and T7. Thus, only the measured values that are assigned to the weighted points in time T7 to T16 are taken into account for determining the equation for the second regression line G2. The weighted points in time T7 to T16 constitute a time window within the time T. In this example, the time window has a width of ten measured values. Of course, other window widths are also possible.

The equation for the second regression line G2 is likewise calculated, for example, using the method of least error squares, no further detail being provided on this here. The gradient of the second regression line G2 corresponds here to the pressure loss in the monitored gas space.

By ignoring the measured values lying ahead of the window bound F in time, that is to say the older measured values, it is possible to detect short term changes in the profile of the process variable P. When, for example, a seal becomes porous at a specific point in time in a monitored gas space, the pressure loss of the gas space increases from, for example, 35 mbar per year to 2000 mbar per year. Because of this higher pressure loss, the blocking pressure is reached much earlier, for example already prospectively 0.4 years after the seal became porous.

Instead of using a time window to determine the equation for the second regression line G2, it is also possible to conceive of other methods in order to take account of the measured values more or less strongly depending on the point in time of their recording. Thus, for example, only every second measured value can be taken into account before a specific point in time, and only every third measured value can be taken into account before a further point in time lying further back.

During operation of a gas-insulated switching installation, it is possible to determine the first regression line G1 and the second regression line G2 regularly.

The first regression line G1 runs in a largely constant fashion, and is relatively insensitive to short term fluctuations, for example change between the daily and nightly temperatures or other disturbances. The first regression line G1 is suitable for predicting long term trends.

The newer measured values are taken more strongly into account than the older measured values in order to determine the second regression line G2. Short term changes, for example when a seal in a monitored gas space becomes porous at a specific point in time, are detected relatively quickly by means of the second regression line G2. The second regression line G2 is suitable for predicting short term trends.

The gradients of the first regression line G1 and of the second regression line G2 can thus be used, on the one hand, to determine a point in time at which the blocking pressure is reached. On the other hand, it is also possible to use knowledge of the gradients to pronounce on the state of the switching installation, in particular to detect damage.

If the gradient of the first regression line G1 corresponds to a pressure loss of more than 100 mbar per year, it is possible to deduce therefrom that the switching installation already had leaks on becoming commissioned, that is to say was not correctly mounted.

A gradient of the second regression line G2 that corresponds to a pressure loss of more than 500 mbar per year indicates, for example, a porous seal.

A further reduction in data can be achieved by combining a plurality of discrete measured values of a plurality of weighted points in time to form a concentrated measured value in each case.

In the case of the example according to FIG. 3, it is possible, for example, to combine twenty four discrete measured values whose weighted points in time lie respectively one hour from one another to form a concentrated daily value. Furthermore, twenty eight daily values can be combined to form a concentrated four week value, and thirteen four week values can be combined to form a concentrated yearly value.

In the case of an intact gas space in a switching installation, the gas pressure varies only very slowly, for example by less than 35 mbar per year. In such a case, it suffices to use concentrated yearly values in order to determine the first regression line G1.

It is possible to determine a first regression line G1 and/or a second regression line G2 regularly independently of one another from the discrete measured values and from the concentrated measured values. Both long term trends and short term trends can be predicted in this way.

For example, it is possible to use the discrete measured values whose weighted points in time respectively lie at one hour from one another to determine a second regression line G2 every hour, the respectively last twenty four discrete measured values, that is to say discrete measured values of a day, being taken into account in order to determine this second regression line G2.

By way of example, the twenty four discrete measured values of each day are additionally combined to form a concentrated daily value. All the concentrated daily values thus obtained are then used daily to determine a first regression line G1. By way of example, alternatively or in addition a second regression line G2 is calculated daily from the respectively last twenty concentrated daily values.

In a similar way, concentrated four week values and concentrated yearly values can be formed, and be used to determine first regression lines and/or second regression lines.

For example, it is sensible to use discrete measured values whose weighted points in time lie relatively close to one another, for example at one hour in each case, to determine a second regression line G2 regularly, and to use concentrated measured values that lie relatively far apart from one another in time, for example by a year in each case, to determine a first regression line G1 regularly. It is possible in this way to detect short term trends and long term trends relatively effectively, and computational outlay for determining said regression lines is relatively low.

A determination of the point in time up to when the blocking pressure is reached cannot be carried out with arbitrary accuracy, but is subject to errors, since a regression line G1 or G2 represents merely an approximation to the measured values, and the measured values do not necessarily lie exactly on the regression line. It is therefore sensible to calculate a time interval within which the blocking pressure is probably reached.

To this end, a coefficient of determination B of the regression is calculated that describes the quality of the regression. The quality of the regression is determined in this case by the deviations of the measured values from the regression line. The mathematical mode of procedure for determining the coefficient of determination B of the regression is not explained here in more detail and is generally known to the person skilled in the art.

When all measured values lie on the regression line, the quality is optimum and it holds for the coefficient of determination that B=1. The smaller the coefficient of determination B, the worse is the quality of the regression, that is to say the measured values deviate relatively strongly from the regression line.

In order to calculate the time interval within which the blocking pressure will probably be reached, and which is fixed by a lower bound TX1 and an upper bound TX2, a coefficient of probability W is calculated using the following equation: W=1−B.

When all the measured values lie on the regression line, it therefore holds for the coefficient of probability that: W=0.

The lower bound TX1 and the upper bound TX2 of the time interval within which the blocking pressure will probably be reached are calculated with the aid of the prospective point in time TX until the blocking pressure is reached and the coefficient of probability W in the following way:

$$TX1=TX(1-W)$$

$$TX2=TX(1+W)$$

By way of example, given a coefficient of determination of B=0.995 as assumed here, the lower bound TX1 is therefore yielded as approximately 22.75 years, and the upper bound TX2 as approximately 22.97 years for the numerical example from FIG. 4 with a prospective point in time until the blocking pressure is reached of TX=22.86 years.

The time interval within which the blocking pressure will probably be reached therefore has a width which can be calculated as a difference between the upper bound TX2 and the lower bound TX1, of approximately 0.22 years or 80.3 days.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

14 Pickup
16 Sensor
18 Intermediate circuit
20 Transmission unit
22 Display unit
24 Recording unit
26 Data processing unit
28 Arithmetic logic unit
S Interfering variable
X Process variable
P Pressure
T Time
H1-H8 Tolerance bands
T0-T16 Weighted points in time
G1 First regression line
G2 Second regression line
F Window bound
B Coefficient of determination
W Coefficient of probability
TX Prospective point in time until the blocking pressure is reached
TX1 Lower bound
TX2 Upper bound

What is claimed is:

1. A method for predictive determination of a process variable (P) in a technical installation using a circuit having a database and a processor, the method comprising:
receiving measured values from a sensor;
recording, in the database, the measured values for the process variable (P) of the technical installation at predeterminable points in time during operation of the technical installation; and
in the processor:
combining temporally successive recorded measured values to form a weighted measured value;
assigning a discrete measured value to each weighted measured value;
estimating a future time profile of the process variable (P) using a regression of the discrete measured values; and
calculating a point in time at which the process variable (P) reaches a predeterminable limit value,
wherein each weighted measured value that lies in a predeterminable tolerance band (H1 ... H8) is assigned a same discrete measured value.

2. The method as claimed in claim 1, wherein the regression is a linear regression.

3. The method as claimed in claim 2, comprising:
calculating a coefficient of determination (B) of the linear regression; and
calculating, with aid of the coefficient of determination (B), a time interval within which the process variable (P) is expected to reach a predetermined value.

4. The method as claimed in claim 2, comprising:
detecting damage to the technical installation using the linear regression.

5. The method as claimed in claim 1, wherein the predeterminable tolerance bands (H1 ... H8) have different widths.

6. The method as claimed in claim 1, comprising:
taking the measured values into account more or less strongly depending on a point in time of their recording.

7. The method as claimed in claim 6, wherein the measured values taken into account are only measured values lying temporally after a predeterminable point in time.

8. The method as claimed in claim 1, comprising:
applying the calculating of a point in time at which the process variable (P) reaches the predeterminable limit value to a gas-insulated switching installation as the technical installation.

9. The method as claimed in claim 8, comprising:
receiving pressure of an insulating gas in a gas space of the gas-insulated switching installation as the process variable (P).

10. The method as claimed in claim 9, wherein the regression is a linear regression.

11. The method as claimed in claim 1, comprising:
calculating a coefficient of determination (B) of the linear regression; and
calculating, with aid of the coefficient of determination (B), a time interval within which the process variable is expected to reach a predetermined value.

12. The method as claimed in claim 11, comprising:
taking the measured values into account more or less strongly depending on a point in time of their recording.

13. The method as claimed in claim 12, comprising:
detecting damage to the technical installation using the linear regression.

14. A system for predictive determination of a process variable (P) in a technical installation, comprising:
a sensor;
a database for recording measured values for the process variable (P) of the technical installation at predeterminable points in time during operation of the technical installation; and
a processor for executing a program for:
combining temporally successive recorded measured values to form a weighted measured value;
assigning a discrete measured value to each weighted measured value;
estimating a future time profile of the process variable (P) using a regression of the discrete measured values; and
calculating a point in time at which the process variable (P) reaches a predeterminable limit value,
wherein each weighted measured value that lies in a predeterminable tolerance band (H1 ... H8) is assigned a same discrete measured value.

* * * * *